United States Patent
Stefanopulos et al.

(10) Patent No.: US 6,694,624 B2
(45) Date of Patent: *Feb. 24, 2004

(54) FIXING DEVICE WITH WEDGE-SHAPED CLAMPING PARTS FOR SAW BLADES

(75) Inventors: Mihail Stefanopulos, Solothurn (CH); Hans Ernst, Kriegstetten (CH); Daniel Saegesser, Langenthal (CH)

(73) Assignee: Scintilla AG, Solothurn (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 206 days.

(21) Appl. No.: 09/284,793
(22) PCT Filed: Aug. 14, 1998
(86) PCT No.: PCT/EP98/05164
§ 371 (c)(1),
(2), (4) Date: Apr. 20, 1999
(87) PCT Pub. No.: WO99/10123
PCT Pub. Date: Mar. 4, 1999

(65) Prior Publication Data
US 2001/0037577 A1 Nov. 8, 2001

(30) Foreign Application Priority Data
Aug. 27, 1997 (DE) .......................................... 197 37 236

(51) Int. Cl.$^7$ ................................................ B23D 51/10
(52) U.S. Cl. ........................ 30/392; 30/337; 83/698.31
(58) Field of Search ........................ 30/394, 393, 392, 30/337; 279/44, 45; 83/698.31

(56) References Cited

U.S. PATENT DOCUMENTS

| | | | | | |
|---|---|---|---|---|---|
| 1,179,476 | A | * | 4/1916 | Thomas | 279/44 |
| 2,107,581 | A | * | 2/1938 | Parsons et al. | 83/698.31 |
| 2,468,195 | A | * | 4/1949 | Hanes | 279/87 |
| 3,865,164 | A | * | 2/1975 | Sybertz | 83/698.42 |
| 4,316,399 | A | * | 2/1982 | Wallis | 83/698.31 |
| 4,601,477 | A | * | 7/1986 | Barrett et al. | 30/394 |
| 5,086,683 | A | * | 2/1992 | Steidinger | 83/698.31 |
| 5,103,565 | A | * | 4/1992 | Holzer, Jr. | 30/392 |
| 5,224,408 | A | * | 7/1993 | Steidinger | 83/698.31 |
| 5,357,836 | A | * | 10/1994 | Stromberg et al. | 83/698.31 |

FOREIGN PATENT DOCUMENTS

DE      9318616      * 2/1994

* cited by examiner

Primary Examiner—Stephen Choi
(74) Attorney, Agent, or Firm—Michael J. Striker

(57) ABSTRACT

A clamping device for motor-driven straight-back and saber saws fixable to a lifting rod, the clamping device has a clamp holder, a movable clamping piece arranged relative to the clamp holder so that a saw blade can rest between the clamp holder and the movable clamping piece, the clamping piece having a first side which faces toward the clamp holder and has a surface adapted to abut against the saw blade, and also a second side which is remote from the clamp holder and has a wedge-shaped surface, a wedge piece having a wedge-shaped surface abutting against the wedge-shaped surface of the clamping piece and also having an opposite surface, and a spring acting on the wedge piece so as to move the clamping piece into a position of repose so that the first surface of the clamping piece presses against the saw blade.

6 Claims, 2 Drawing Sheets

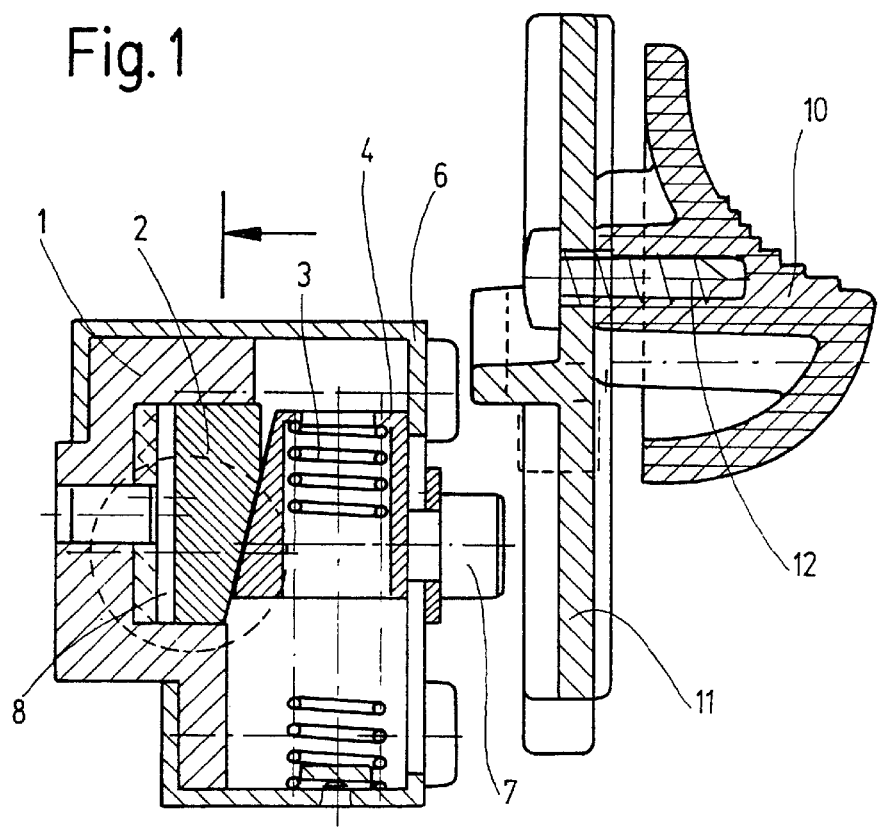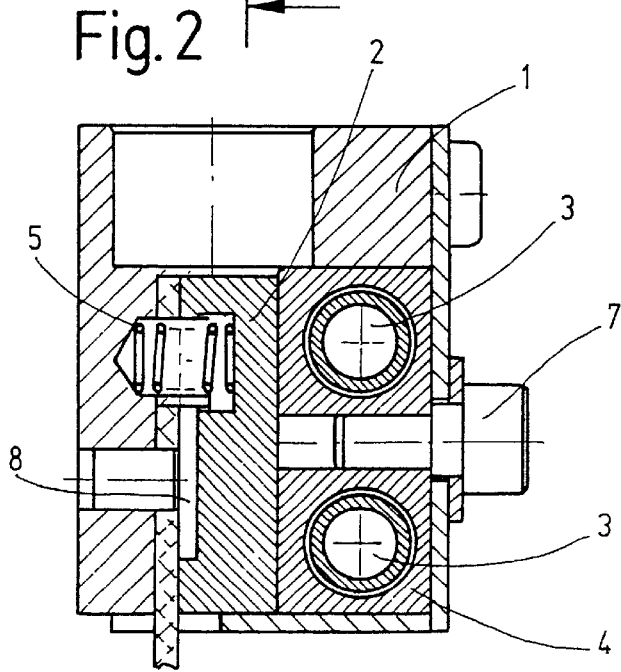

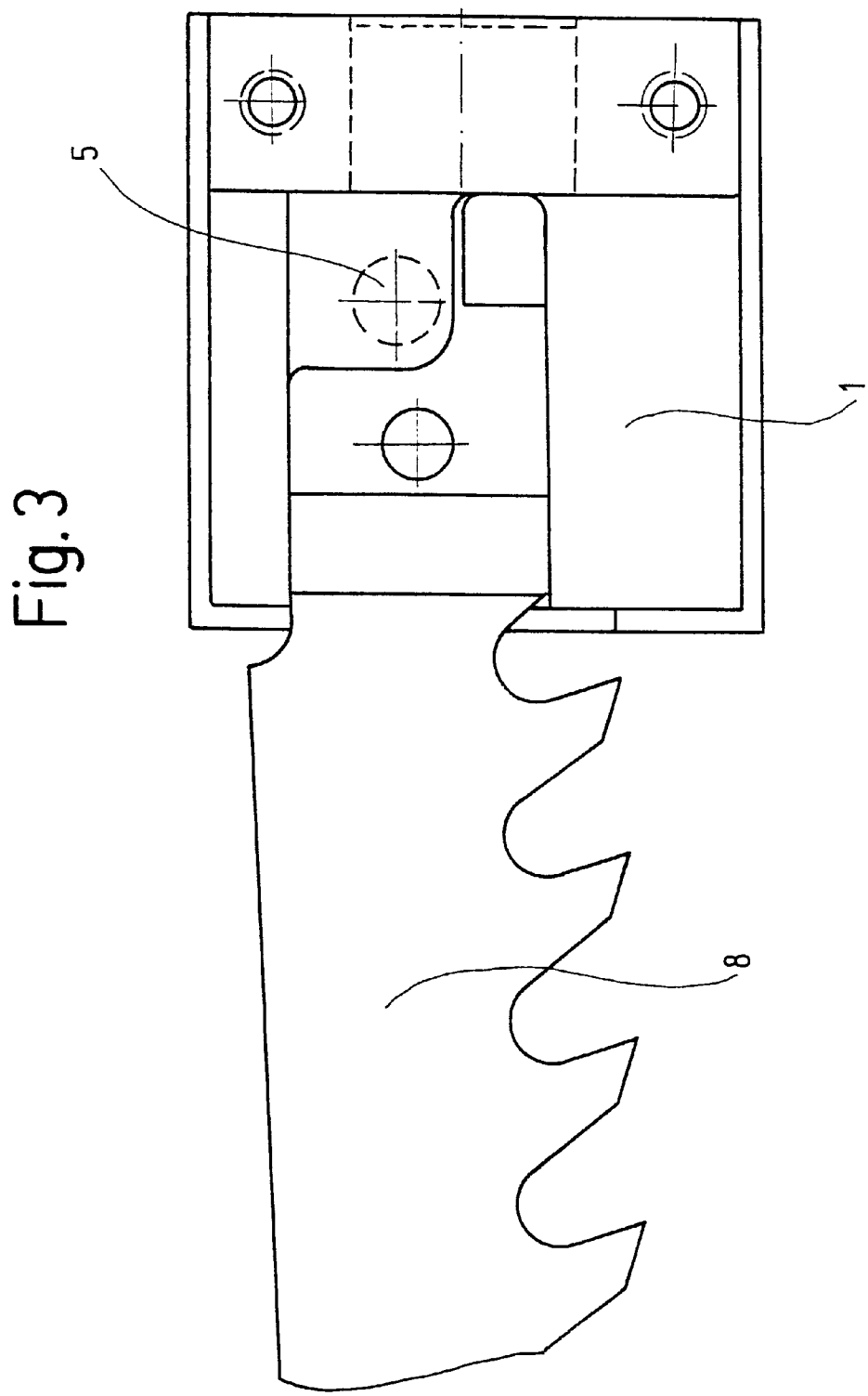

FIXING DEVICE WITH WEDGE-SHAPED CLAMPING PARTS FOR SAW BLADES

BACKGROUND OF THE INVENTION

The invention relates to a clamping device for saw blades, in particular in motor-driven straight-back and saber saws.

In the known motor driven straight-back and saber saws, the saw blades are secured to clamping devices of a lifting rod. This requires using additional tools to fasten the saw blade securely and in form-locking fashion to the clamping device. Changing the saw blade can generally be done only whenever the lifting rod is in a certain position.

The conventional clamping devices also have the disadvantage that the screws that have to be tightened to fix the saw blade can loosen during operation, since considerable forces are exerted precisely in straight-back and saber saws.

SUMMARY OF THE INVENTION

The object of the present invention is therefore to create a clamping device which overcomes the disadvantages of the prior art.

In keeping with these objects and with others which will become apparent hereinafter, one feature of present invention resides, briefly stated, in a clamping device for saw blades, which is formed so that a saw blade rests between a clamp holder and a movable clamping piece, the clamping piece is formed as a wedge on a side remote from the saw blade, a wedge piece is formed as a wedge on a side which rests on the side of the clamping piece, and the wedge piece is movable by a spring so that the clamping piece presses against the saw blade.

The clamping device for saw blades according to the invention has the advantage over the prior art that without an auxiliary tool and using only a single handle piece, the saw blade can be mounted and unmounted conveniently and quickly and without the risk of injury. According to the invention, the saw blade is fixed in a clamp holder by means of two wedges acting counter to one another. The forces required for the contrary motion of the wedges are brought to bear by springs.

Changing the saw blade can also be done in any lifting position, so that to change the saw blade it need not be moved to a particular position.

The wedgelike design of the clamping pieces also creates self-locking, because of the steeply sloped planes formed between the clamping pieces and the wedge piece. This leads to a secure hold of the saw blade and to form-locking guidance of it.

It is advantageous to embody the wedge-like sides of the clamping piece or of the wedge piece as either convex or concave, with the opposed wedgelike piece being shaped in the respectively other way. This brings about easier friction of the faces against one another.

By actuating a handle piece that is secured to the housing, the saw blade can also be released with one hand, so that the saw blade can then be removed from the clamping device.

BRIEF DESCRIPTION OF THE DRAWINGS

One exemplary embodiment of the invention is described in further detail in the ensuing description in conjunction with the associated drawings. Shown are:

FIG. 1, a schematic cross section through a clamping device and the associated handle piece;

FIG. 2, a cross section through the clamping device, offset by 90° from FIG. 1; and FIG. 3, a schematic longitudinal section along the saw blade of FIG. 1, offset by 90°.

DESCRIPTION OF THE EXEMPLARY EMBODIMENT

FIG. 1 shows a cross section in the direction of a saw blade 8, while FIG. 2 shows a cross section through the clamping device of the invention. Within the context of the present description, only those components essential to the invention are to be described. The structure and function, particularly of motor-driven straight-back and saber saws, are well known.

The clamping device has a clamp holder 1 and a clamping piece 2, between which the saw blade 8 is placed and firmly clamped. The clamping piece 2 is embodied in wedgelike fashion on the side remote from the saw blade. A further wedge piece 4 is disposed on the wedgelike side of the clamping piece 2; one side of this wedge piece is straight while the other side, which touches the wedgelike side of the clamping piece 2, is also wedgelike. By means of two compression springs 3, the wedge piece 4 is moved into the position of repose of the compression springs 3 in such a way that the wedge piece 4 moves the clamping piece 2 in the direction toward the saw blade 8; the force of the spring is thus transmitted to the clamping piece 2, and the saw blade 8 is fastened in place as a result. The clamping piece 2 is prestressed against the wedge piece 4 by a restoring spring 5 and is guided in a recess of the clamp holder 1. The two springs 3 are received in the wedge piece 4 and are additionally guided along a cover plate 6. The cover plate 6 is also mounted on the clamp holder 1 and encloses the entire clamping device, so that the clamping device forms a unit. For operating the clamping device, there is an opening in the cover plate 6. Through this opening, a bolt 7 is connected to the wedge piece 4. The opening is preferably covered by a sealing element, so that no dust from outside can get into the interior of the clamping device.

The clamping device is operated now in such a way that the bolt 7 is moved vertically counter to the spring force of the springs 3 of the clamping piece 4. As a result of the lessening force on the clamping piece 2, the clamping piece is pressed away from the saw blade or from the clamp holder 1 by the restoring spring 5. This enlarges the interstice between the clamp holder 1 and the clamping piece 2, so that the saw blade 8 can either be put in place or removed. The vertical motion of the bolt 7 tenses the springs 3, so that after the bolt 7 is let go, the springs 3 return the wedge piece 4 to its position of repose and in the process again press the clamping piece 2 against the clamp holder 1 or against the saw blade 8 placed in it.

The clamping device is fixed to the lifting rod of the drive mechanism of the saw. The lifting rod and the drive mechanism, not shown, of the saw are disposed in a housing, also not shown. The housing also encloses the clamping device in the region of the full lifting distance.

A handle piece 10 is disposed on the outside of the housing. On the opposite side, in the interior of the housing, there is a driver 11, which is connected to the handle piece on the outside of the housing by a fastening means 12. The driver 11 has a length such that it sweeps over the entire lifting distance of the lifting rod. The handle piece is guided in an oblong slot disposed vertically to the lifting direction in the housing.

For actuating the clamping device, the handle piece 10 is now moved toward the bolt 7 of the clamping device, so that the driver 11 presses down on the bolt 7. Since the driver 11 is disposed along the full lifting distance, the saw blade 8 can be released or fastened in any position of the clamping device.

The handle piece is disposed movably vertically to the lifting direction, and when the handle piece 10 is pressed down, the driver 11 is also moved in the vertical direction and then carries the bolt 7 of the clamping device along with it, whereupon the wedge piece 4 is moved out of its position of repose. As a consequence, the clamping piece 2 is moved away from the clamp holder 1 by the force of the restoring spring 5. In this open position, the saw blade can be put in place or removed. After the handle piece 10 is let go, the spring force of the compression springs 3 moves the wedge piece 4 back into the position of repose and in the process moves the clamping piece 2 counter to the clamp holder 1, and optionally the shaft of the saw blade 8 comes to rest between the clamp holder 1 and the clamping piece 2.

FIG. 3 shows a longitudinal section through the clamping device with the section taken along the saw blade 8. The clamp holder 1 and the saw blade 8 inserted into the clamp holder 1 are shown. The shaft of the saw blade expediently has a recess, to assure the function of the restoring spring. If the thickness of the material of the shaft of the saw blade 8 is selected suitably, a form-locking contact of the clamping piece 2 with the surface of the shaft of the saw blade 8 occurs upon actuation of the clamping device. Protuberances can also be provided on the clamping piece 2 that engage corresponding indentations or bores in the shaft of the saw blade when the clamping piece 2 is moved toward the saw blade 8. Other provisions for attaining a form-locking connection between the shaft of the saw blade and the corresponding clamping piece 2 are known to one skilled in the art and may for instance be in the form of T-shaped shoulders and the like.

What is claimed is:

1. A clamping device for motor-drive straight-back and saber saws fixable to a lifting rod, the clamping device comprising a clamp holder; a movable clamping piece arranged relative to said clamp holder so that a saw blade can rest between said clamp holder and said movable clamping piece, said clamping piece having a first side which faces toward said clamp holder and has a surface adapted to abut against the saw blade, and also a second side which is remote from said clamp holder and has a wedge-shaped surface; a wedge piece having a wedge-shaped surface abutting against said wedge-shaped surface of said clamping piece and also having an opposite surface; a first spring acting on said wedge piece in a direction essentially perpendicular to a displacement direction of said clamping piece so as to move said clamping piece into a position of repose so that said first surface of said clamping piece presses against the saw blade; and a second spring acting on said clamping piece so as to press said clamping piece against said wedge piece.

2. A clamping device as defined in claim 1, wherein said surfaces of said clamping piece and said wedge piece which abut against one another include a concave surface and a convex surface.

3. A clamping device as defined in claim 1, and further comprising a cover plate; and a bolt which is fixed to said wedge piece and passes through said cover plate out of the clamping device.

4. A clamping device as defined in claim 3, and further comprising a handle piece provided with a T-shaped driver which cooperates with said bolt to displace said bolt and said wedge piece so as to move said clamping piece away from said clamp holder in order to put the saw blade in or to release the latter.

5. A clamping device as defined in claim 4, wherein said T-shaped driver has a longer part with which said handle piece is connected, and a shorter part extending perpendicular to said longer part and cooperating with said bolt.

6. A clamping device as defined in claim 5, wherein said longer part of said driver extends substantially perpendicular to said displacement direction of said clamping piece and substantially parallel to a displacement direction of said wedge piece, while said shorter part of said driver extends parallel to said displacement direction of said clamping piece.

\* \* \* \* \*